United States Patent

[19]

Jephott et al.

[11] Patent Number: 5,975,245

[45] Date of Patent: Nov. 2, 1999

[54] TEMPERATURE REGULATING LIQUID CONDITIONING ARRANGEMENT

[75] Inventors: Dominic G E Jephott, Bristol; Ian M Cox; Steven C Penny, both of Yeovil; Ronald J Purvey, Axminster, all of United Kingdom

[73] Assignee: The Glacier Metal Company Limited, United Kingdom

[21] Appl. No.: 08/894,272

[22] PCT Filed: Jan. 26, 1996

[86] PCT No.: PCT/GB96/00172

§ 371 Date: Aug. 15, 1997

§ 102(e) Date: Aug. 15, 1997

[87] PCT Pub. No.: WO96/26353

PCT Pub. Date: Aug. 29, 1996

[30] Foreign Application Priority Data

Feb. 18, 1995 [GB] United Kingdom .................... 9503411

[51] Int. Cl.⁶ ....................................................... F01M 1/10
[52] U.S. Cl. ...................... 184/104.3; 184/6.24; 165/119; 123/196 AB
[58] Field of Search ............................. 184/104.1, 104.2, 184/104.3, 6.24, 1.5; 165/119; 210/500.1; 208/177; 123/196 R, 196 A, 196 AB

[56] References Cited

U.S. PATENT DOCUMENTS

| | | | |
|---|---|---|---|
| 2,713,422 | 7/1955 | James | 210/122.5 |
| 4,638,856 | 1/1987 | Yamanaka et al. | 165/119 |
| 4,831,980 | 5/1989 | Nasu et al. | |
| 4,878,536 | 11/1989 | Stenlund | 165/119 |
| 4,975,188 | 12/1990 | Brunsell et al. | 210/324 |
| 5,014,775 | 5/1991 | Watanabe | 184/104.3 |
| 5,326,461 | 7/1994 | Legrand et al. | |
| 5,382,355 | 1/1995 | Arldzynski | 165/119 |
| 5,472,045 | 12/1995 | Poehlman | 165/119 |
| 5,603,829 | 2/1997 | Baumann | |
| 5,718,281 | 2/1998 | Bartalone et al. | 165/119 |

FOREIGN PATENT DOCUMENTS

| | | |
|---|---|---|
| 0 200 809 | 11/1986 | European Pat. Off. |
| 0 631 037A1 | 6/1994 | European Pat. Off. |
| 1934193 | 7/1969 | Germany |
| 33 17 008 | 11/1984 | Germany |
| 3444267 A1 | 6/1986 | Germany |
| 38 31 847 | 11/1989 | Germany |
| 4306431 C1 | 7/1994 | Germany |
| 2 160 499 | 12/1985 | United Kingdom |
| 2 160 796 | 1/1986 | United Kingdom |
| 2 163 967 | 3/1986 | United Kingdom |

Primary Examiner—Tamara L. Graysay
Assistant Examiner—David Fenstermacher
Attorney, Agent, or Firm—Nixon & Vanderhye P.C.

[57] ABSTRACT

Apparatus for conditioning liquid such as lubricating oil of an engine in respect of cleaning it and regulating its temperature has, integrated into a single housing which is coupled to the engine block with aligned passages, a full flow cleaning element, a bypass centrifugal cleaning element and a heat exchanger element, the latter being formed as part of single closure element for the housing and removable for access to the cleaning elements. The heat exchange element may be disposed elsewhere in the housing and share a chamber with the full flow heating element, possibly one surrounding the other. The heat exchange element may be part of heat exchange apparatus which responds to the temperature of the liquid to effect heating or cooling to maintain a demanded temperature.

5 Claims, 5 Drawing Sheets

TEMPERATURE REGULATING LIQUID CONDITIONING ARRANGEMENT

BACKGROUND OF THE INVENTION

This invention relates to conditioning arrangements for conditioning a liquid circulated through a system, and in particular to regulating the temperature of the liquid.

Liquid may typically be circulated through a system to provide motive power to one or more elements of the system or to provide lubrication to bearings of an engine or the like.

Considering an engine lubrication system, a lubricating liquid such as, oil, is circulated by way of a pump driven by the engine and passed through a conditioning arrangement which conditions the liquid by cleaning the liquid of solid contaminants.

It is known to provide such a conditioning arrangement with both so-called full flow cleaning elements and by-pass centrifugal cleaning elements.

Examples of such arrangements containing both cleaning element types are disclosed in GB-A-2160796, GB-A-2160449 and DE-C1-4306431, all of which disclose coaxially arranged full flow and centrifugal cleaning elements within housing means that is arranged to be coupled to an engine block. The housing means forms part of a liquid lubricant circulation system of the engine, receiving a liquid lubricant therefrom and returning it thereto by way of aligned passages or ducts. Most of the liquid, after passage through the full flow element, is returned to the engine under pressure in order to lubricate bearings etc. whereas a proportion of the lubricant by-passes that element to the centrifugal cleaning element from which it is returned directly to a reservoir or sump.

GB-A-2160449 discloses coaxially disposed cleaning elements, one surrounding the other, and capable of separate removal in an axial direction, whereas GB-A-2160796 discloses cleaning elements axially displaced and accessible from different axial directions by way of separately removable parts of the housing means. DE-C1-4306431 discloses both cleaning elements axially displaced within a single housing and removable in the same axial direction.

While the presence of both cleaning element types in a conditioning arrangement serves to condition the liquid in an efficient manner by removing contaminant particles of all sizes, cleaning the liquid of solid contaminants does not necessarily place the liquid in optimum condition if the operating conditions are such that the liquid is too cold to flow properly or so hot that its viscosity falls.

It is of course known to have sump heating means to raise the temperature of liquid lubricant at start-up in extremely cold climates, notwithstanding that in an internal combustion engine, the temperature is soon raised to an operating norm.

It is known also to have heating and/or cooling means associated with lubricating liquid for use by an engine as it is circulated and cleaned by a typical full flow cleaning element.

Such means may take the form of a heat exchanger matrix disposed separately of the engine block, usually where it is in a stream of cooler air caused to pass across it, and liquid is piped from the engine thereto and back again. Such a matrix may have a full flow filter in line with the liquid flow, but the use of a discrete matrix and external pipework increase both initial and maintenance costs, assuming space is available, while also being potentially vulnerable to damage. The damage that can be caused by loss of liquid lubricant, even at a small rate in a relatively short interval (compared with the wide tolerance of viscosity changes acceptable to most engines,) means that temperature regulation of the liquid by such externally effected lubricant cooling is employed only where it is considered essential and, not merely beneficial to engine efficiency.

As an alternative to such remote cooling of liquid lubricant, engines which have the liquid cleaned by a full flow cleaning element of the self-contained kind, that is, as a sealed canister containing a paper, or like, filter element and adapted to be screwed onto a mounting block which also transfers liquid to and from the engine, may have the mounting block adapted to include or support a simple heat exchanger element in the form of a water jacket to which the canister is actually screwed and through which the liquid is directed by additional pipework or ducting.

Examples of liquid lubricant cleaning arrangements which have such associated heat exchanger elements are disclosed in GB-A-2163967, EP-A-0200809, DE-C-3444267 and DE-A-1934193.

If the mounting is adapted such that the heat exchanger is formed integrally within it, the casting becomes complex, whereas if it is a separate element interposed between conventional mounting block and the cleaning element canister, there are two interfaces for liquid transfer that have potential for leakage.

Such arrangements as described also introduce resistance into the liquid flow by forcing it through a confined passage of the heat exchanger and do not offer a cost effective approach to effecting such cooling, or possibly heating, of liquid when the cleaning includes not only a full flow cleaning element but also a selfWO powered centrifugal cleaner to operate on a portion of the liquid by-passing the full flow cleaning element.

It will be appreciated that liquid cleaning and conditioning systems are not restricted only to lubricating oil systems of internal combustion engines, and preserving the generality of the foregoing it is an object of the present invention to provide a liquid temperature regulating liquid conditioning arrangement which includes liquid filtering by both full flow and centrifugal cleaning elements that is of simple, compact and practicable construction, and which mitigates actual or potential disadvantages of techniques hitherto previously adapted to perform a similar function.

According to the present invention a temperature regulating liquid conditioning arrangement comprises housing means, adapted for attachment to apparatus for supplying liquid under pressure and utilizing conditioned liquid returned thereto, having defined therein a plurality of chambers arranged individually to contain centrifugal and full flow cleaning elements disposed coaxially with respect to each other and with respect to a single housing closure means providing access to the housing chambers, and heat exchange means comprising a heat exchange element operably disposed within a chamber of the housing filled with the liquid and in the liquid flow path of the full flow cleaning element such that the liquid is exposed to the heat exchange element.

Embodiments of the invention with regard to conditioning a liquid that is the lubricating oil of an internal combustion engine will now be described further herein, in which:

DETAILED DESCRIPTION OF THE INVENTION

Figure 1:
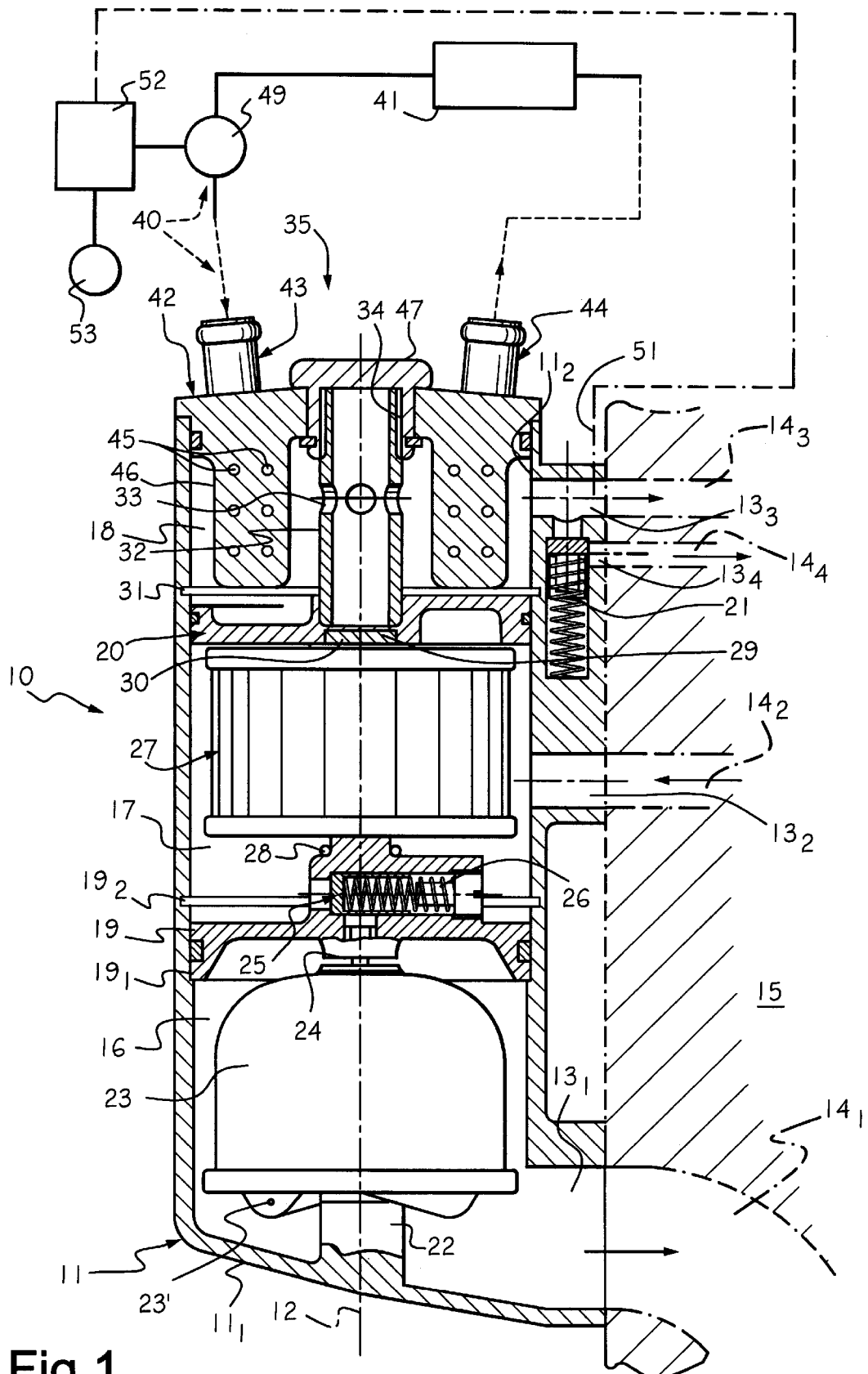
FIG. 1 is a sectional elevation through a first form of an integrated temperature regulating liquid conditioning arrangement in accordance with the present invention showing a housing having coaxial full flow cleaning element, centrifugal cleaning element and heat exchange element axially separated within discrete chambers in a common housing of which a removable closure incorporates the heat exchange element.

Referring to FIG. 1, a temperature regulating liquid conditioning arrangement 10 comprises a housing 11 that is a generally tubular body surrounding a longitudinal axis 12 thereof having laterally extending passages $13_1, 13_2, 13_3$, and $13_4$ adapted to line up with corresponding lubricant passages $14_1, 14_2, 14_3$, and $14_4$ in an engine block 15 to which the housing is operably secured with the axis 12 substantially vertical. The housing is closed at one axial end $11_1$ which forms a floor or base but open at the other end $11_2$.

The housing is divided into three discrete chambers 16, 17 and 18 by bulkhead means comprising removable bulkheads 19 and 20.

The bulkhead 19 is arranged to locate against shoulder $19_1$ in the housing wall to limit its proximity to the end wall $11_1$ and a radially contractible snap ring $19_2$ is arranged to locate in a groove in the housing wall above the bulkhead to act as a retainer therefor should the housing become inverted.

The lower chamber 16 contains lateral passage $13_1$ which couples by way of engine block duct $14_1$ to an engine sump (not shown) containing a reservoir of liquid lubricant and the end wall $11_1$ of the housing defines a sloping floor to the chamber permitting liquid to empty therefrom by gravity.

The end wall $11_1$ of the housing also has a pedestal 22 extending axially into the chamber 16 on which is mounted for rotation about the axis a centrifugal cleaner element 23, the element being supported at its upper end by a tubular spindle 24 which extends down through the bulkhead 19 and supplies liquid to the inside of the element.

The bulkhead 19 also contains a valve 25 which controls the passage of liquid through the bulkhead and into the spindle 24 from middle chamber 17, the valve being closed by a bias spring 26 such that it is only opened when the pressure of liquid in the chamber 17 exceeds a predetermined minimum at which it is appropriate to direct some of it through the centrifugal cleaner.

The middle chamber 17 connects with liquid inlet passage 132, which couples by way of engine block duct 142 to receive pressurised liquid from a pump (not shown) driven by the engine and contains a full flow cleaning element 27, comprising a tubular body of pleated mesh contained between end caps $27_1$ and $27_2$.

The lower end cap $27_1$ is supported on the bulkhead 19 and by way of a spring 28 therebetween the upper end cap $27_2$, which is centrally opened, is biased against bulkhead 20 such that the central aperture 29 is aligned with an axial passage 30 in the bulkhead.

The bulkhead 20 is secured with respect to the housing, being prevented from displacement towards the open end of the housing, by a radially contractible snap ring 31 locatable in a recess in the housing wall and supports at its center, surrounding passage 30, a stand tube 32 which extends through the upper chamber 18 along the axis. The stand tube has lateral apertures 33 connecting with the chamber and is threaded at its upper end 34 to receive removable closure means indicated generally at 35, for both the stand tube and the surrounding chamber, and being therefore closure means for the housing.

The upper chamber 18 connects with liquid outlet passages $13_3$ and $13_4$, the former being connected to engine block duct $14_3$ to supply liquid to bearings and like parts of the engine requiring a constant supply of cleaned lubricant delivered at an optimum pressure and the latter being connected by way of engine block duct $14_4$ to the sump when a pressure relief valve 21 opens to return pumped liquid to the sump if the pressure in passage $13_3$ exceeds the optimum pressure.

In an operating manner that is conventional, liquid is supplied by way of duct $13_2$ to chamber 17; the liquid passes in a generally radial direction through the apertured screen mesh of full flow cleaning element 27 and then to the centre region thereof from which it passes through the end cap aperture 29 and bulkhead passage 30 (and by way of stand tube 32 and upper chamber 18) to exit along passage $13_3$. As back pressure is established in the chamber 17, bias of valve 25 in the bulkhead 19 is overcome and liquid therefrom is permitted to enter the axial passage 24 and thus centrifugal cleaning element 23, exiting from the element by way of reaction nozzles 23' before returning to the sump by way of passage $13_1$.

In accordance with the present invention, there is also provided heat exchange means indicated generally at 40. The heat exchange means comprises a source 41 of a heat transfer medium, conveniently a liquid such as water having good thermal conductivity, although to avoid confusion with the liquid to be conditioned, it is convenient to refer to it throughout this specification as the "medium". The source 41 may also be a conventional radiator exposed to a flow of cool air. The heat exchange means also comprises a heat exchange element 42 having conduction means for the medium, namely inlet and outlet pipes 43, 44 respectively, joined by one or more heat exchanging pipes 45, possibly with heat conducting fins 46, which extends axially into the chamber 18 and around central stand tube 32. The heat exchange element is operably immersed in the liquid that fills the chamber such that the liquid flowing through the chamber between the stand tube apertures 33 and the outlet passage 133 flows across the surface of the heat exchange element which can conduct heat to the medium and vice versa.

The heat exchange element is mechanically connected to a central nut member 47 and comprises therewith the removable closure means 35 for the housing.

The heat exchange means further comprises means 49, such as a circulating pump, to cause the medium to pass from inlet to outlet pipe by way of the heat exchanging pipe(s) 45 to effect a transfer of heat by way of each heat exchanging pipe in response to a temperature difference between the medium and the liquid.

It will be appreciated that if the liquid passing through the full flow cleaning element 25 is hotter than the medium in the heat exchange means some of the heat will be transferred to the fluid such that the temperature of the liquid leaving the conditioning arrangement by way of passage $13_3$ is lower than without the heat exchange means and its viscosity normally greater. Furthermore, provided heat gained by the medium is also removed by a further heat exchanger 41 a relatively small quantity of medium may be re-circulated to extract excessive heat from the cleaned liquid.

It will be appreciated that the efficiency of heat transfer between the liquid and the fluid medium in the heat exchange means is a function of the temperature of medium entering the heat exchange element and its flow rate. To this end, and particularly where the medium is forcibly circulated, the heat exchange means 40 may include sensing means, such as indicated at 51 disposed in the outlet passage $13_3$ or at some other point in the housing or engine to sense a parameter at least related to the temperature of the liquid, that is, the temperature itself or the related parameter such as viscosity, means to vary the effective thermal capacity of the fluid medium, such as the circulating pump 49 and heat exchanger 41, and control means 52, operable in response to signals from the sensing means and a demand or datum source 53 which represents a demanded temperature for the liquid, to vary the effective thermal capacity of the medium by way of the circulating rate of pump 49 and/or radiating efficiency of heat exchanger 41 to maintain the temperature of the liquid substantially at the demanded value.

It will be appreciated that the heat exchange means may take a variety of different forms which will be recognized by those skilled in the art of temperature regulation and implemented without the need for detailed descriptions.

For example, the heat exchange means may operate with a medium comprising a volatile liquid that is both circulated and compressed by the circulating pump 49, that is, as a refrigerator, or may operate other than with a forced circulating pump 49, the liquid being caused to circulate by way of 'gravity' convection currents or by some other mechanism, such as a heat pipe, that operates by a combination of evaporation and condensation of a volatile liquid. The fluid medium may alternatively be of a purely gaseous nature rather than a liquid. The heat exchange means may be other than a closed system that restores fluid temperature and recycles it, discarding the fluid medium after passage through the heat exchange element and replenishing it with fresh fluid.

It will be appreciated that the heat exchange means may provide heating as well as, or instead of, cooling of the liquid by use of a heat exchanger 41 which includes a source of heat. Such heat, particularly when required prior to starting the engine and/or to rapidly modify a normally cooling effect a fluid medium, may be provided by using an electric current as the heat transfer medium and one or more electrical conductors (i.e., heating elements) disposed in the chamber 18.

The precise structure of the heat exchange element is open to variation, but preferably, when it occupies its own discrete chamber, it has a structure which serves to act to maximize the path between the chamber inlet apertures 33 and outlet passage $13_3$ and thus the dwell time of the liquid in the chamber. The closure means 35, in carrying the heat exchange element therewith, when removed from the housing by removal of nut 47 also removes the heat exchange element and provide ready access to the full flow cleaning element 27 (after removal of snap ring 31 and bulkhead 20) and centrifugal cleaning element 23 (after removal of the element 27, snap ring 192 and bulkhead 19).

It will be appreciated that the heat exchange element may be disposed differently with respect to the housing and the cleaning elements, particularly the full flow element, therein.

Figure 2:
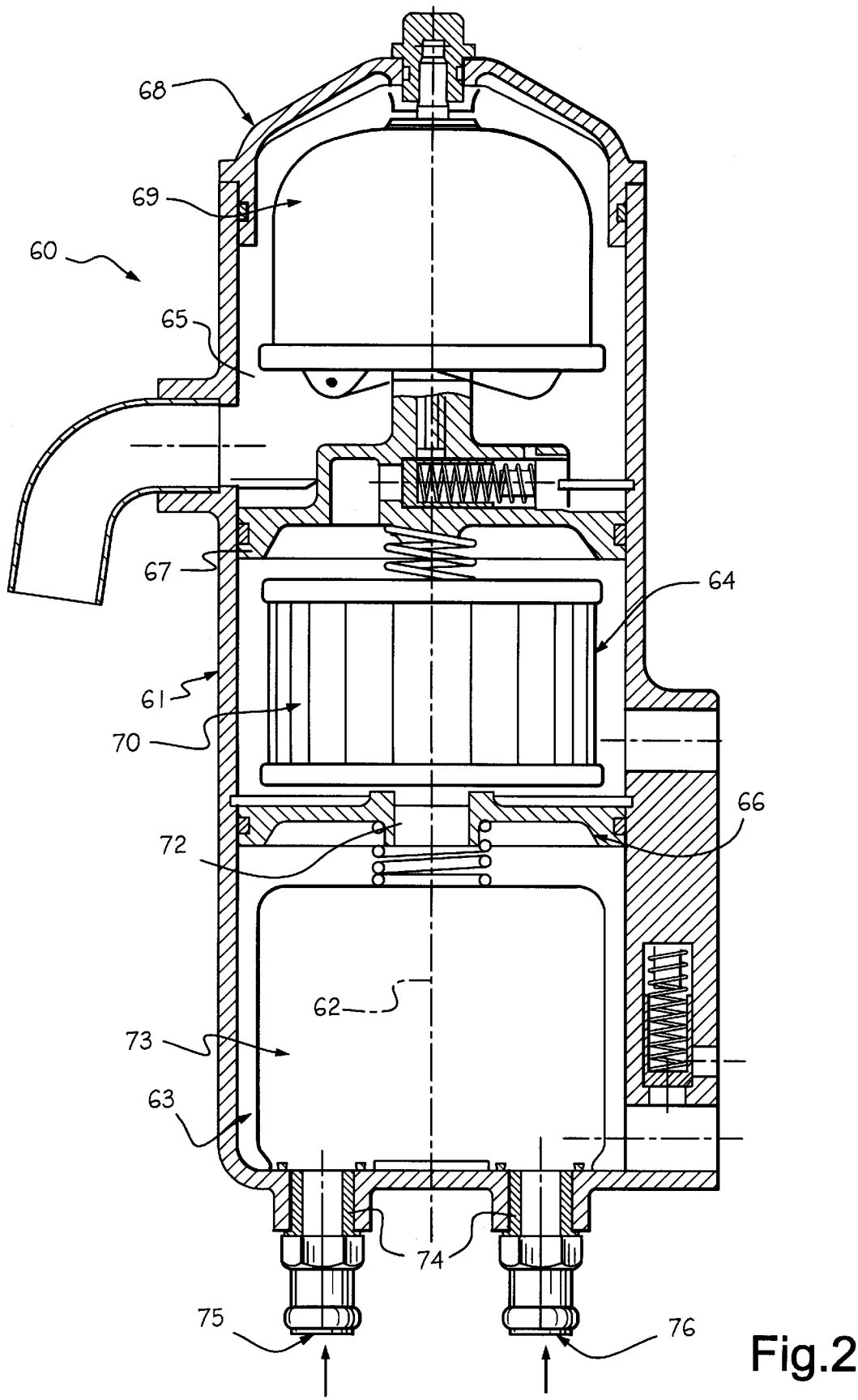
FIG. 2 is sectional elevation through a second form of conditioning arrangement comprising discrete chambers, similar to FIG. 1, but with the heat exchange element fixed with respect to the housing and the centrifugal cleaner disposed adjacent removable housing closure for ease of access.

Referring to FIG. 2, a second form of temperature regulating liquid conditioning arrangement 60 comprises a generally tubular housing 61 having an operably vertically disposed longitudinal axis 62 and is divided lengthwise into three chambers 63, 64 and 65 by removable bulkheads 66 and 67. A cover 68 of chamber 65 supports a centrifugal cleaner element 69 mounted on bulkhead 67 and the middle chamber 64 contains a full flow cleaner element 70 mounted between the bulkheads. The lower chamber 63, which receives liquid from the full flow element by way of axial passage 72, contains a heat exchange element 73 which rests against the end of the housing and is secured by way of gland seals 74 secured to the inlet and outlet pipes 75, 76 respectively. Operation is essentially as described above for the arrangement 10, except that the heat exchange element does not require to be removed to access the cleaning elements.

Figure 3:
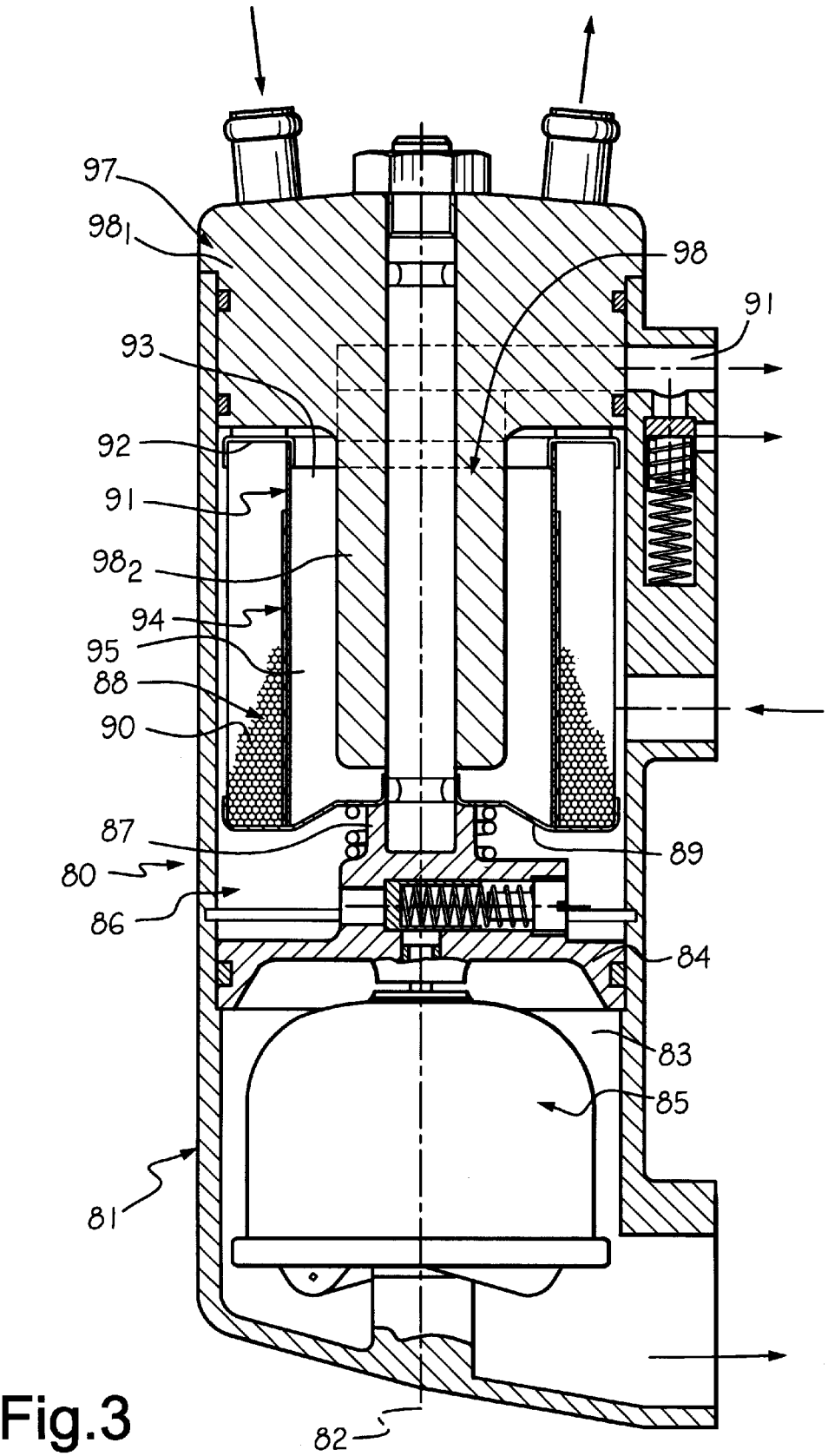
FIG. 3 is a sectional elevation through a third form of conditioning arrangement having a disposition of elements generally similar to FIG. 1 but with the heat exchange element disposed in the same chamber as the full flow cleaning element and extending axially parallel thereto, with the cleaning element surrounding the heat exchange element and providing a removable closure for the housing.

Referring to FIG. 3, a third form of liquid conditioning arrangement 80 comprises a generally tubular housing 81 similar to the housing 11 described above and having an operably vertically disposed longitudinal axis 82. The housing has a lower chamber 83 defined by bulkhead 84 and containing a centrifugal cleaning element 85 that is mounted between the bulkhead and floor of the housing. The bulkhead 84 defines above it a chamber 86 and has an upwardly extending pedestal 87 upon which is supported a full flow cleaning element 88. The cleaning element 88 comprises a closed lower end piece 89 upon which is supported an annular pleated mesh screen 90 through which liquid in the chamber flows in a radially inward direction. The mesh screen is supported for strength by a perforated tube 91 which extends between the lower end piece 89 and an upper end piece 92 having central aperture 93. The mesh screen is surrounded for part of its length by an unperforated baffle 94 which constrains the liquid that flows radially through the mesh to flow also lengthwise before it is permitted to pass through the perforated tube 91 and into a central region 95, which region is in communication with outlet passage 96.

Removable closure means for the housing, indicated generally at 97, also comprises a heat exchange element 98 which shares the chamber 86 with the full flow cleaning element. An upper part $98_1$ is solid and forms a removable sealable closure for the housing, whilst the lower part $98_2$ comprises heat transfer medium conductors, such as the fluid carrying pipes or the like described above. The heat exchange element extends axially parallel to the full flow element and is surrounded thereby.

Whereas the arrangement 80 is functionally similar to the arrangement 10, there is one less bulkhead within the housing and the full flow cleaning element and heat exchange element has greater axial length without extending the housing.

Figure 4:
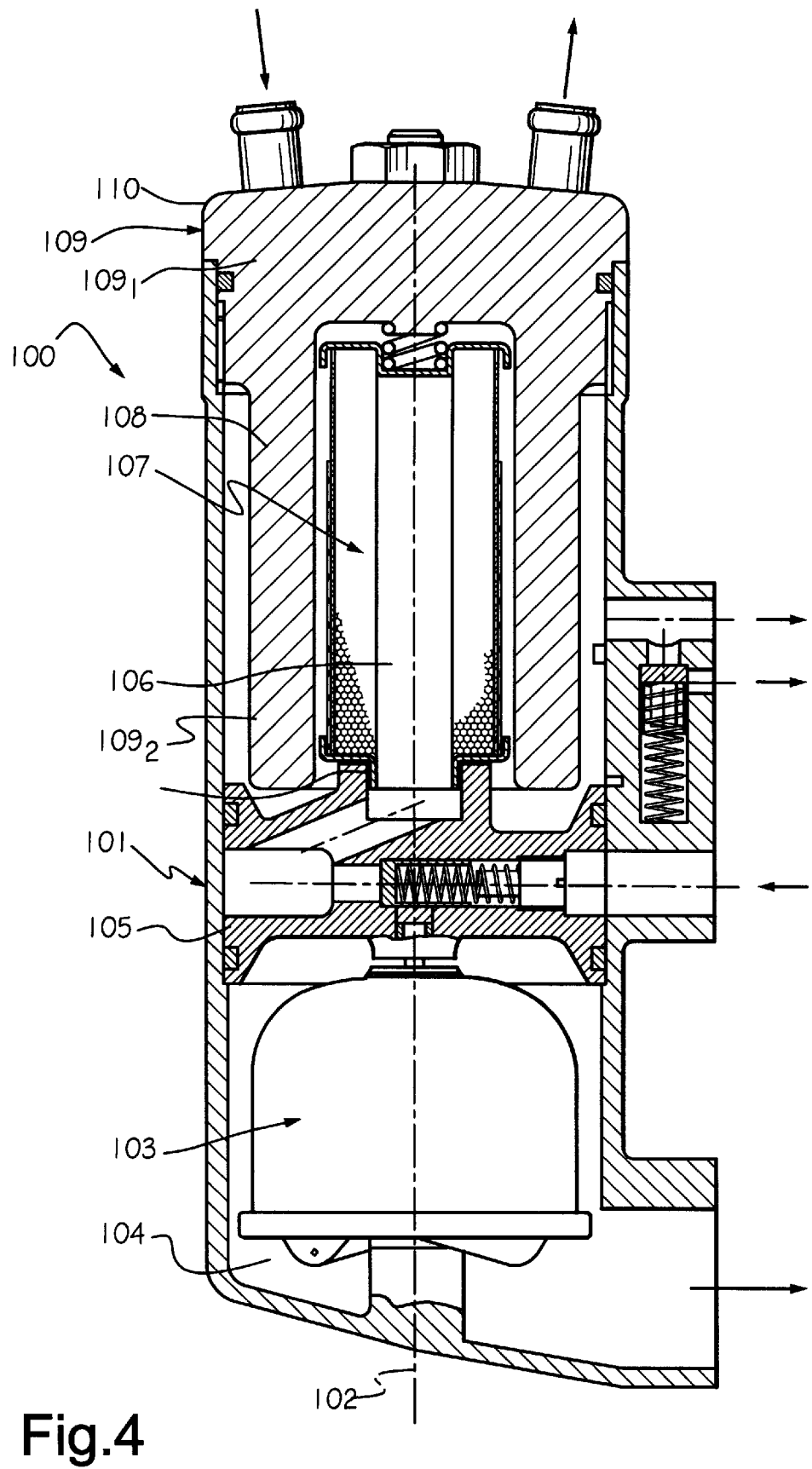
FIG. 4 is a sectional elevation through a fourth form of conditioning arrangement that is generally similar to that of FIG. 3 but with the axially extending heat exchange element surrounding the full flow cleaning element.

A variation on this arrangement is shown in a fourth form 100 in FIG. 4. In this arrangement housing 101 having operably vertical axis 102 contains a centrifugal cleaning element 103 in a lower chamber 104 defined by a modified form of bulkhead 105 which supports, and supplies liquid to, the centre part 106 of a full flow cleaning element 107. The cleaning element is surrounded by a lower part $109_2$ of heat exchange element 109 whose upper part $109_1$ forms a removable closure for the housing indicated by 110. It will be appreciated that although the arrangements 80 and 100 have been shown with the heat exchange element in the upper part of the housing and carried by, and removable with housing closure means, it may also be disposed similarly with respect to the full flow cleaning element, that is, one element surrounding the other, in the lover part of the housing in the manner of FIG. 2.

Figure 5:
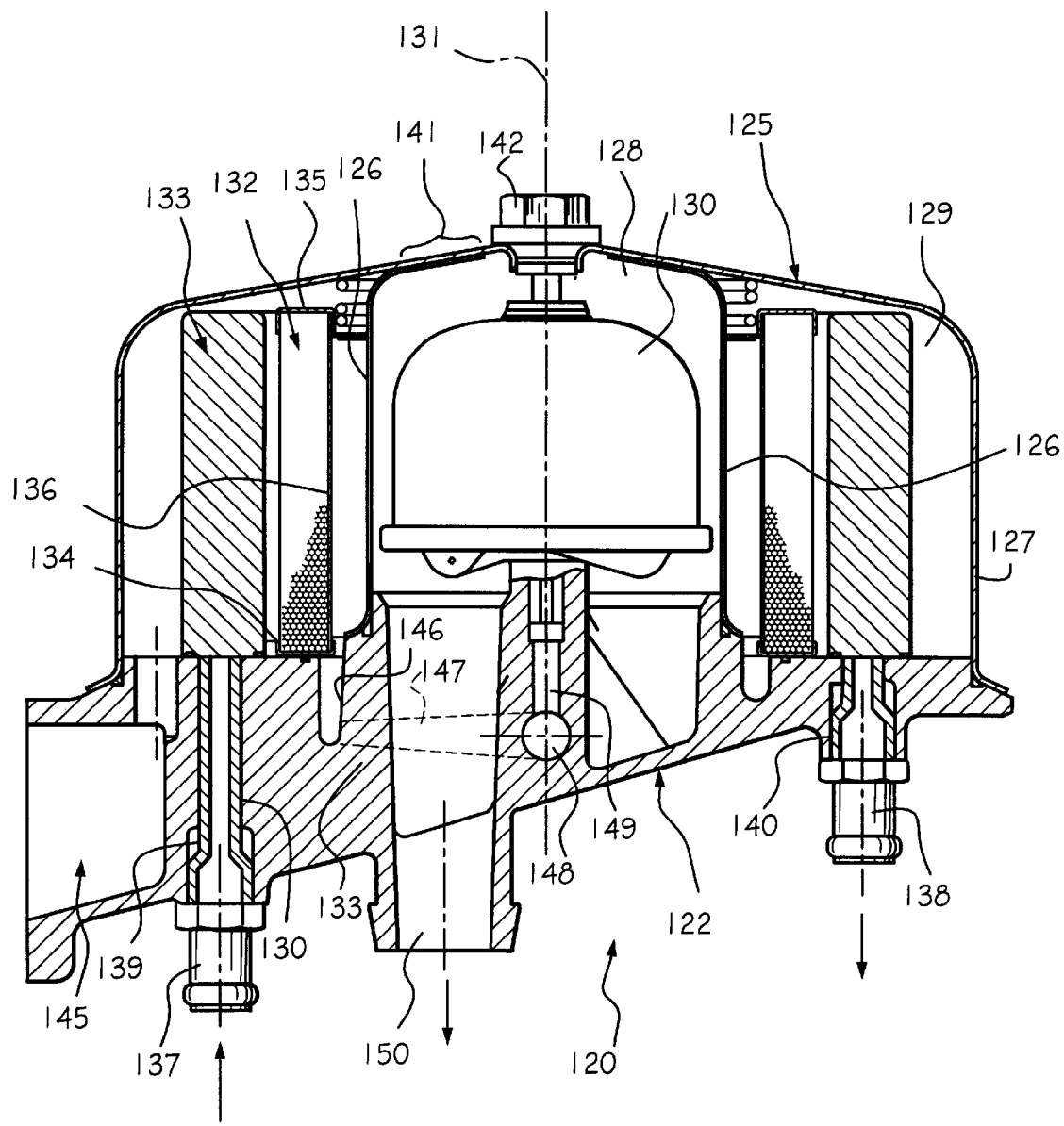
FIG. 5 is a sectional elevation through a fifth form of conditioning arrangement in which the centrifugal cleaning, full flow cleaning and heat exchange elements are disposed together in an annular chamber of the housing, radially surrounding the chamber containing the centrifugal cleaning element.

In the arrangements 80 and 100 the full flow cleaning element and heat exchange element share a chamber in line with the chamber containing the centrifugal cleaning element. In a fifth form of the arrangement shown at 120 in FIG. 5, and based upon the arrangement in the aforementioned G3-A-2160449, housing 121 comprises a base portion 122 and a closure 125 which defines, by way of axially extending inner and out walls 126 and 127, a central chamber 128 and a surrounding chamber 129. The base portion 122 supports a centrifugal cleaning element 130 for rotation about an operably vertical axis 131 within the central chamber 128 whereas the surrounding chamber 129 contains an annular full flow cleaning chamber 132 surrounded in turn by an annular heat exchange element 133. The full flow cleaning element is supported by radially extending end pieces 134, 135 and axially extending perforated tube 136 carried by the inner housing wall 126 whereas the heat exchange element is supported with respect to the base 131 by way of inlet and outlet pipes 137, 138 extending through liquid-tight mounting glands 139, 140 in the base. As shown, the inner and outer housing walls 126 and 127 are not attached to each other to form a unitary structure but in a region 141 radially displaced from the axis 131 are capable of abutting to form a liquid tight seal in response to the housing being forced by mounting nut 142 axially towards the base.

Liquid supplied to the arrangement 120 enters chamber 129 by way of inlet passage 145 and passes radially through the heat exchange element to reach the full flow cleaning element 132 through which it also passes radially to exit by way of trough 146, a cross passage 147 and outlet passage 148. A by-pass passage 149, which includes a valve (not shown) similar to valve 15 in FIG. 1, permits a proportion of the liquid exiting the full flow element to enter the centrifugal cleaning element by way of the axial mounting spindle, liquid exiting the centrifugal element draining by way of gravity through passage 150.

Operation is therefore substantially as described above, the embodiment exhibiting not only an axially compact arrangement which permits access to both cleaning elements but also demonstrating that the liquid may be passed across the heat exchange element before passage through the full flow cleaning element.

Clearly other disposition of cleaning element and heat exchange elements are possible as are the number of any such element in any arrangement housing.

Heat exchange means has been described in a form having a heat exchange element associated with the liquid which flows through the full flow element. It will be appreciated that the, or another, heat exchange element may be associated with liquid specifically intended for passage through the centrifugal cleaning element, for instance, if the viscosity of the liquid has to be kept within a specific range of values to permit efficient operation of the centrifuge in reaction to the liquid being ejected therefrom by way of the usual tangentially directed nozzles.

It will be appreciated that although the above described forms are all shown in relation to engines in which the liquid is a lubricant therefore, they may be adopted for operation with any other machine and liquid which may be other than a lubricant.

What is claimed is:

1. A temperature regulating liquid conditioning arrangement comprising a tubular housing having a longitudinal axis and having at one end a closed floor and at the other end a removable closure, said tubular housing being adapted for operation with the longitudinal axis substantially vertical; bulkhead means, comprising at least one bulkhead, disposed within the tubular housing between the floor and the closure and operable to divide the housing into a plurality of in-line chambers in fluid communication by way of the bulkhead means; a centrifugal cleaning element and a full flow cleaning element, disposed coaxially with respect to each other in separate of said in-line chambers in fluid communication by way of the bulkhead means; a centrifugal cleaning element and a full flow cleaning element, disposed coaxially with respect to each other in separate of said in-line chambers and removable from the housing, at least one of said cleaning elements being supported coaxially therein by said bulkhead means; and heat exchange means comprising a source of heat transfer fluid medium, a heat exchange element comprising a container for the fluid heat transfer medium, and inlet and outlet pipes arranged for connection to said source, and a heat exchange chamber, arranged to be filled with a liquid to be conditioned, located within the housing between said floor and said bulkhead means and in a flow path of the full flow cleaning element, said heat exchange element being disposed in said heat exchange chamber immersed in said liquid to be conditioned and supported therein by said floor such that the inlet and outlet pipes extend from the housing in a direction parallel to said longitudinal axis.

2. The arrangement as claimed in claim 1 in which the heat exchange element is disposed in another in-line chamber separate from, and communicating with, said in-line chamber containing the said full flow cleaning element, by way of another bulkhead discrete from said at least one bulkhead.

3. The arrangement as claimed in claim 2 in which said at least one bulkhead and said another bulkhead are arranged to be releasably secured to the tubular housing against movement in an axial direction.

4. The arrangement as claimed in claim 1 in which said at least one bulkhead includes liquid passage means extending therethrough and pressure responsive valve means operable to control the flow of liquid to be conditioned between the chambers containing the full flow and centrifugal filter elements respectively, to supply said liquid to be conditioned to the centrifugal filter element.

5. The arrangement as claimed in claim 1 in which the heat exchange means comprises sensing means, operable to determine a parameter at least related to the temperature of the liquid to be conditioned, means to vary the effective thermal capacity of the heat transfer medium passing through the heat exchange element, and control means operable in response to said sensing means to vary the effective thermal capacity of the heat transfer medium to maintain the temperature of the liquid to be conditioned substantially at a predetermined value.

\* \* \* \* \*